(12) United States Patent
Grundl et al.

(10) Patent No.: US 7,014,587 B2
(45) Date of Patent: Mar. 21, 2006

(54) POWER SHIFT AUTOMATIC GEARBOX FOR MOTOR VEHICLES

(75) Inventors: Andreas Grundl, Munich (DE); Bernhard Hoffmann, Starnberg (DE)

(73) Assignee: Compact Dynamics GmbH, Starnberg (DE)

( * ) Notice: Subject to any disclaimer, the term of this patent is extended or adjusted under 35 U.S.C. 154(b) by 59 days.

(21) Appl. No.: 10/471,979

(22) PCT Filed: Mar. 19, 2002

(86) PCT No.: PCT/EP02/03038

§ 371 (c)(1),
(2), (4) Date: Feb. 17, 2004

(87) PCT Pub. No.: WO02/079660

PCT Pub. Date: Oct. 10, 2002

(65) Prior Publication Data

US 2004/0147355 A1    Jul. 29, 2004

(30) Foreign Application Priority Data

Mar. 19, 2001 (DE) ................. 101 13 300

(51) Int. Cl.
*F16D 19/00* (2006.01)
*F16D 27/00* (2006.01)
*F16D 37/02* (2006.01)

(52) U.S. Cl. .............. 475/5; 192/3.55; 192/84.6; 475/8

(58) Field of Classification Search ............. 475/2, 475/5, 8, 116; 192/3.55, 3.56, 84.1, 84.6, 192/94, 97
See application file for complete search history.

(56) References Cited

U.S. PATENT DOCUMENTS

| 1,635,068 | A | * | 7/1927 | Bing ..................... 192/84.6 |
| 3,235,045 | A | * | 2/1966 | Pop ..................... 192/18 B |
| 3,507,374 | A | * | 4/1970 | Allaben, Jr. ............ 192/84.7 |
| 4,895,236 | A |   | 1/1990 | Sakakibara et al. |
| 5,024,638 | A |   | 6/1991 | Sakakibara et al. |
| 5,199,325 | A | * | 4/1993 | Reuter et al. ........... 74/335 |
| 5,944,630 | A | * | 8/1999 | Omote .................. 477/5 |

(Continued)

FOREIGN PATENT DOCUMENTS

DE     3843989     7/1989

(Continued)

*Primary Examiner*—Tisha Lewis
(74) *Attorney, Agent, or Firm*—Tarolli, Sundheim, Covell & Tummino L.L.P.

(57) ABSTRACT

An automatic powershift gearbox with at least one gearbox assembly for selecting the respective gear ratios and with at least one multiple-disk clutch capable of being actuated in a controlled manner for holding or releasing individual elements of the planet gear, which allows gear shift operations without interrupting the torque flow. The multiple-disk clutch comprises a first and a second disk set which are in mutual engagement and can be brought into friction engagement by axial compression against one another. The first disk set is connected with a first shaft, and the second disk set is connected with a second shaft. The multiple-disk clutch is coupled by a transmission with an electric machine comprising a rotor and a stator, for bringing the two disk sets into and out of friction engagement by means of the electric machine. The rotor of the electric machine is supported rotatably and axially movable on one of the shafts by means of a gearbox for converting a rotary motion into a thrust motion.

7 Claims, 3 Drawing Sheets

U.S. PATENT DOCUMENTS

| | | |
|---|---|---|
| 6,294,854 B1 | 9/2001 | Grosspietsch et al. |
| 6,725,990 B1 * | 4/2004 | Bowen ........................ 192/35 |
| 6,780,134 B1 * | 8/2004 | Vonnegut et al. ........... 475/204 |
| 6,808,052 B1 * | 10/2004 | Kirkwood et al. ............. 192/35 |
| 6,808,053 B1 * | 10/2004 | Kirkwood et al. ......... 192/84.6 |
| 2003/0199356 A1 * | 10/2003 | Biallas ....................... 475/154 |

FOREIGN PATENT DOCUMENTS

| | | |
|---|---|---|
| DE | 19837115 | 5/2000 |
| DE | 19851738 | 5/2000 |
| FR | 2782361 | 8/1999 |
| WO | 99/64756 | 12/1999 |
| WO | 02/079660 | 10/2002 |

* cited by examiner

POWER SHIFT AUTOMATIC GEARBOX FOR MOTOR VEHICLES

BACKGROUND OF THE INVENTION

The invention relates to an automatic powershift gearbox with at least one gearbox assembly for selecting the respective gear ratios and with at least one multiple-disk clutch capable of being actuated in a controlled manner for holding or releasing individual elements of the planet gear, which allows gear shift operations without interrupting the torque flow. The multiple-disk clutch comprises a first and a second disk set which are in mutual engagement and can be brought into friction engagement by axial compression against one another. The first disk set is connected with a first shaft, and the second disk set is connected with a second shaft. The multiple-disk clutch is coupled by a transmission with an electric machine comprising a rotor and a stator, for bringing the two disk sets into and out of friction engagement by means of the electric machine.

DEFINITIONS

Automatic gearboxes for motor vehicles are distinguished by so-called automated gearboxes and so-called automatic powershift gearboxes, which with respect to their effect on the driving dynamics are based on different concepts which are explained in more detail in the following.

STATE OF THE ART

In the state of the art it is know to realise automated gearboxes in that in manually-operated gearboxes all gear shift operations which are usually carried out by the driver are taken over by an electronically controlled actor system. With respect to driving physics this means that during a gear shift operation, a clutch must always be opened so that the torque flow is interrupted.

With the automatic powershift gearboxes which are also known in the state of the art, it is also possible to shift gears under load. With respect to driving physics this means that also during a gear shift operation, the torque flow and thus the tractive power is not interrupted.

A decisive difference between these two concepts is the marked reduction in comfort, in particular in passenger cars with high acceleration capability or in vehicles with off-road use, where an interruption of the tractive power during the gear shift operation is not acceptable in terms of driving physics.

Automatic powershift gearboxes carry out starting, selection of the respective gear ratios, and gear shifting automatically. As a starting element, a hydrodynamic torque converter with or without lockup clutch for eliminating the torque converter slip is usually employed which also serves for vibration damping.

For selecting the respective gear ratios several sets of planet gears are used which are connected downstream of the hydrodynamic torque converter and whose number and arrangement depend on the number of gear steps and the required gear ratios.

The individual elements of the planet gears are held or released by means of hydraulically operated multiple-disk clutches and multiple-disk brakes, which permits gear shift operations without an interruption of the torque flow.

A gearbox control unit is used to define the respective gear steps and shift times as a function of the position of the selector lever, the accelerator pedal position, the engine condition, and the velocity of the vehicle. The gearbox control unit is usually operated electronically/hydraulically.

A motor driven hydraulic pump provides for the supply of the hydrodynamic torque converter, the shift elements, and the gearbox control unit with hydraulic pressure.

From WO 99/64756 a clutch assembly is known by means of which the speed differences of two shafts can be compensated. A clutch pressure plate is displaced in the axial direction by means of an electrically driven motor. For this purpose, the motor is arranged so that it surrounds one of the shafts and is adapted to cause a hollow nut to rotate. The hollow nut is supported at the housing of the electric motor and serves to move a hollow spindle in the axial direction, which is supported on the shaft. A further bearing is installed on the hollow nut, which carries a driver. This driver operates a spring which acts on the clutch pressure plate.

This is disadvantageous because of the high expenditures for the bearings of the electric motor and the hollow nut/spindle arrangement on the shaft and in the clutch housing.

From DE 198 37 115 A1 a drive assembly for a motor vehicle is known in which an electric motor can be coupled by means of a locking device to the drive train of the motor vehicle consisting of combustion engine, clutch, and output shaft. The concepts described in this documents are, however, very weak as far as their technical realisation is concerned. In particular, there is no indication for the realisation of the locking device and its coupling to the drive train.

From DE 38 989 A1 an actuator for a friction clutch of a manually-operated gearbox is known, which couples two shaft sections together. At the outside of a manually-operated gearbox an electric motor is attached which actuates a piston valve via a threaded spindle/nut arrangement, which radially protrudes towards the shaft and is supported in an axial/radial ball bearing on the shaft. A lever engages the axial/radial ball bearing, which acts upon a clutch pressure plate which engages or disengages, respectively, the clutch.

In this case, too, the high expenditures for the bearings and the considerable space requirement of the overall arrangement are disadvantageous.

Problem on Which the Invention is Based

The above described automatic powershift gearboxes have rotating hydraulic actuators for the actuation of the hydraulically actuated multiple-disk clutches. Their seals are also subjected to rotation. This leads to considerable friction losses (up to 5% of the total torque transmitted by the automatic powershift gearbox). In addition, the concurrently occurring leakage of the hydraulic fluid results in an additionally required pressure to be provided by the motor driven hydraulic pump. Finally, the hydraulic operation of the multiple-disk clutches necessitates very high expenditures. Further, the above described arrangements with electric motors for the operation of the multiple-disk clutches are equipped with very expensive bearing arrangements.

The invention is therefore based on the object to modify these automatic powershift gearboxes in such a manner that they are significantly more economic and have a higher efficiency.

Inventive Solution

The inventive solution of this object consists in that in an automatic powershift gearbox of the initially described type the rotor of the electric machine is supported rotatably and axially movable on one of the shafts by means of a gearbox for converting a rotary motion into a thrust motion. In other words, according to the invention the rotor of the electric motor is positioned within the overall arrangement, on the one hand, via its air gap to the stator and, on the other hand, via the gearbox for the conversion of the rotary motion into the thrust motion.

This completely novel configuration is advantageous in that the expensive hydraulic cylinder/piston arrangement for the operation of the multiple-disk clutch, whose seals cause significant friction losses is omitted and replaced by an electric motor. The electric motor, may, however, produce losses (electric losses and others) during its operation, but in its end position in which the multiple-disk clutch is engaged or disengaged the losses should by minimised. The permanent friction losses of the seals, however, are eliminated by the invention. The reason for this is, among others, that the rotor of the currentless electric motor can rotate with the same speed as the shaft carrying it so that no losses are occurring. This configuration further permits to have the rotor act on the disk set which is also attached to this rotor so that not speed differences (and thus friction losses) occur between the rotor and the disk set. This configuration provides a number additional advantages and benefits which will be explained in more detail further below.

Advantageous Developments of the Invention

In a preferred embodiment of the invention the gearbox for converting a rotary motion into a thrust motion consists of a spindle/nut arrangement one part of which is connected with one of the shafts in a non-rotatable and axially non-movable manner, and the other part of which is connected with the rotor in a non-rotatable and axially non-movable manner. This is a possibility to support the rotor on the shaft without necessitating the separate roller or ball bearings which are required in the state of the art.

According to the invention the rotor of the electric machine upon current supply further carries out an axial movement relative to the second or the first, respectively, shaft, which depends on its speed and/or sense of rotation, and in the currentless condition has essentially the speed of the shaft on which it is carried. This aspect of the invention represents a remarkable difference compared to the configurations according to the state of the art: According to the invention the rotor is always co-rotating with the shaft carrying it when the electric motor is in the currentless condition. By variations in speed and/or sense of rotation (caused by a respective current supply) of the rotor relative to the speed of the shaft, the rotor carries out an axial movement (relative to the shaft) and operates the multiple-disk clutch. In the state of the art the electric motors are arranged as independent assemblies on/in the gearbox and operate independently from the rotation of the shaft.

The rotor of the electric machine is further rotatably connected with the disk set which is arranged at the shaft carrying the rotor, so that upon an axial movement of the rotor the two disk sets come into and out of friction engagement. This rotatable connection can be realised in such a manner that with the multiple-disk clutch being not in a friction engagement the electric machine has virtually no connection with the multiple-disk clutch. Since, incidentally, the two disk sets are separated from one another, no torque is transferred. The motor may, but need not, be disconnected from the respective disk set. Regardless of this, no friction losses can occur with the present invention as are experienced in conventional arrangements. One of the two shafts may be designed as a hollow shaft into which the other shafts coaxially protrudes.

The rotor of the electric machine is preferably rotatably connected with the disk set by means of a spring element which is at least partially compliant in the axial direction. With the rotor being in a position in which the multiple-disk clutch is not in friction engagement, the spring element is not in contact with the rotor and/or the second disk set, or rotates with the same speed as the disk set and the currentless rotor of the electric motor, respectively, so that no friction losses occur.

According to the invention the electric machine is an asynchronous machine or a permanent field machine, with permanent field machines contrary to asynchronous machines though being of especially small installation size generate long-term losses in the stator even in the non-driven condition. Principally, other types of machines, e.g. so-called switched reluctance machines, are possible. That which is decisive is that the machine can be manufactured economically, has a long life, can provide a sufficiently high holding torque, and covers a speed range of up to approx. 8000 rpm (i.e. the maximum speed of the shaft carrying the rotor of the electric machine).

In a preferred embodiment of the invention an element (e.g. the spindle) of the spindle/nut arrangement has an engaged end position and a disengaged end position with one locking location each, and another element (e.g. the nut) of the spindle/nut arrangement has locking elements which are adapted to lock in the respective locking locations when the rotor of the electric machine has reached the respective end position.

The electric machine is further connected with an electronic control unit which is adapted to operate the electric machine either as an electric motor or as an electric generator. For this purpose, the electronic control unit has a power control capability which depends on the type (permanent field machine, asynchronous machine or the like) of the electric machine and which enables to feed electric power into the electric machine (electric motor operation) as well as to withdraw electric power from the electric machine (generator operation). Such an arrangement may be used (also in a combination of several actors) as a generator or a starter, respectively.

To this end, the electronic control unit is connected with a sensor arrangement which is adapted to provide a signal indicative for the rotation of the first shaft. In the case of a sensorless machine control unit it is, however, also possible to do without sensor. The electronic control unit is further adapted to operate the electric machine in the electric motor mode with a speed differing from the speed of the first shaft, for bringing the multiple-disk clutch into the engaged or disengaged, respectively, position. Depending on the sense of rotation of the first shaft and its speed as well as depending on whether the multiple-disk clutch is to be engaged or disengaged, the rotor of the electric machine—controlled by the electronic control unit—rotates either at a higher or at a lower speed than the first shaft. If the rotor is not to carry out a relative movement in the axial direction with respect to the first shaft, the rotor—controlled by the electronic control unit rotates in the currentless condition or by driving in one of the end positions—in the same direction and with the same speed as the shaft carrying it.

BRIEF DESCRIPTION OF THE DRAWING

The drawings illustrate details of the invention in various embodiments.

DETAILED DESCRIPTION OF THE DRAWING

Figure 1:
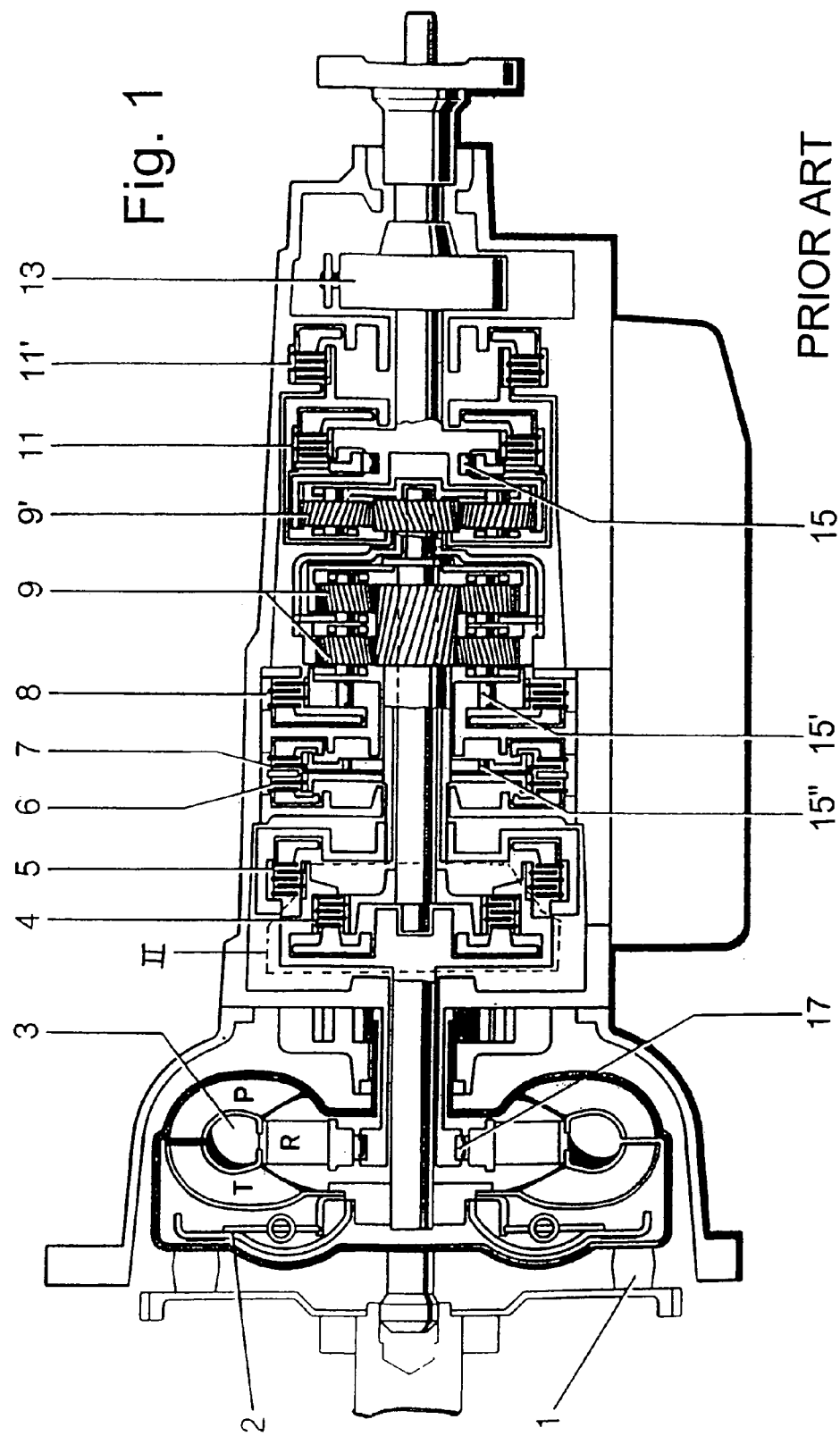
FIG. 1 is a schematic side view of an automatic powershift gearbox according to the state of the art.

The gearbox illustrated in FIG. 1 according to the state of the art for passenger cars with rear-wheel drive has a hydraulic torque converter 3 with a converter lockup clutch 2. At higher speeds the converter operates as a hydraulic torque coupling. The downstream planet gear sets provide for the gearing up of the other four forward gears and the reverse gear by the optional holding or blocking of their shafts, with the highest gear comprising gearing up to higher speeds. The multiple-disk clutches used for blocking are controlled via a hydraulic control system which automatically initiates the gear shift operation as a function of the selected drive positions, the driving speed, the driving condition, as well as the motor load.

In the first gear which in terms of gearing up corresponds approximately to the second gear of a manually-operated gear-box, the clutches 4 and 11 are closed. The front planet gear carrier of the gear set 9 bears against the free-wheeling device 15 in the case of tension, while it is overridden in the case of thrust. The planet gear set 9' co-rotates as a block. With the drive position selector lever being in position "1" and thus changing into higher gears being undesired in order to be able to decelerate by means of the engine, the clutch 8 is additionally closed. In the third gear the clutches 4, 5, 7, and 11 are closed, the free-wheeling devices 15' and 15" are overridden. The planet gear sets 9 and 10 co-rotate as a block with the transmission ratio of 1:1.

In the fourth gear the multiple-disk clutches 4, 5, 7, and 11" are closed, the free-wheeling devices 15, 15' and 15" are overridden, and the planet gear set 9 co-rotates as a block, while the hollow shaft with the sun gear of the planet gear set 9' is stationary so that gearing up to higher speeds is effected. Moreover, the hydrodynamic torque converter 3 from a certain driving velocity upward.

In the reverse gear the clutches 5, 8, and 11 are closed, the planet gear set 10 co-rotates as a block, and the sense of rotation of the output shaft is reversed via the held front planet gear carrier of the gear set 9. At the output side a centrifugal switch 13 is provided which generates pulses for the control system corresponding to the velocity.

Figure 2:
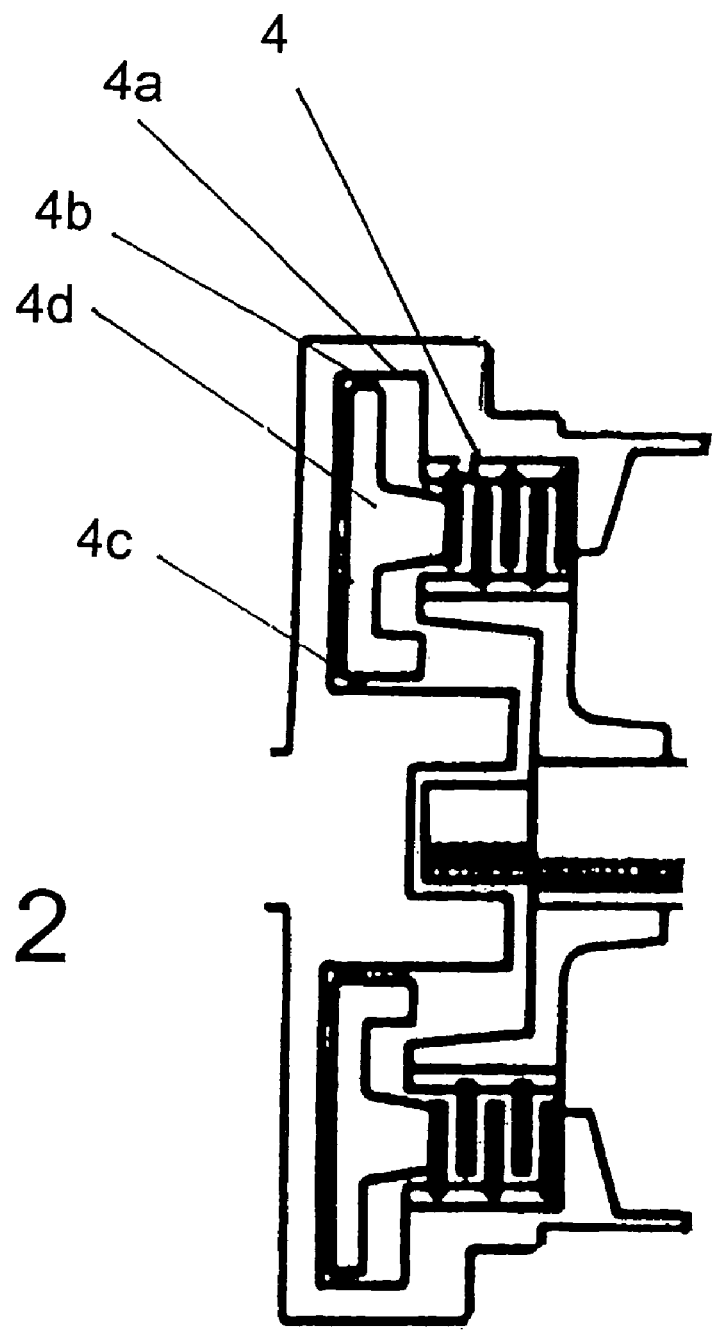
FIG. 2 shows a section II surrounded by broken lines in FIG. 1, in which according to the invention the hydraulic cylinder/piston arrangement is to be replaced by the arrangement according to FIG. 3.

The cutout II from FIG. 1 shown in FIG. 2 depicts the multiple-disk clutch 4 with an associated cylinder/piston arrangement 4a, 4b. Due to the fact that the piston 4b rotates relative to the cylinder 4a, the inner and outer seals 4c, 4d are subjected to considerable stresses and thus to wear. Upon subjection with hydraulic fluid, the piston 4b urges the disk sets of the multiple-disk clutch 4 together.

Figure 3:
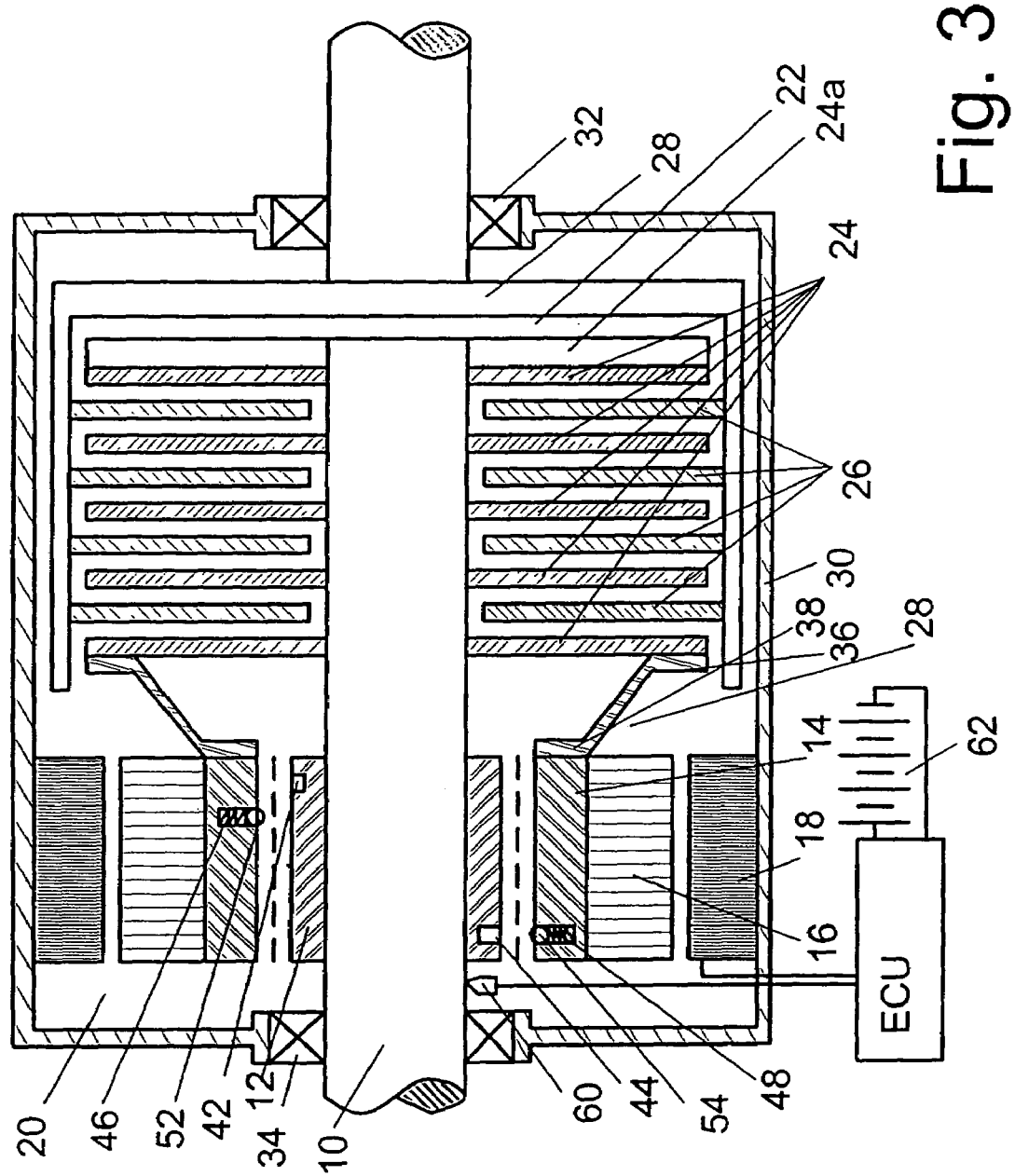
FIG. 3 shows a schematic cutout of an automatic powershift gearbox according to the invention.

The cutout of an inventive arrangement shown in FIG. 3 corresponds to the arrangement of FIG. 2 with respect to its function. Here, however, the cylinder/piston arrangement from FIGS. 1, 2 is replaced according to the invention by an electric machine which is coupled by a transmission with the multiple-disk clutch in order to bring the two disk sets into or out of friction engagement.

On a first shaft 10 which acts as the drive shaft of the automatic powershift gearbox a spindle 12 provided preferably with a multiple male thread is arranged so as to be locked against rotation and axial displacement. A nut 14 provided with a corresponding female thread is arranged in screwed engagement on the spindle 12. On the outside of the nut 14 a rotor 16 of an electric machine 20 is arranged in a non-rotatable manner. This rotor 16 is surrounded by a stator 18 from which it is separated by an air gap. This allows the rotor 16 to move also in the axial direction upon a relative rotation about the shaft 10. For both the rotor 16 and the stator 18 the electric details (phase feed lines, stator windings, squirrel cage winding, etc.) have been omitted for the sake of clarity. The electric machine 20 for an automatic powershift gearbox of a passenger car may have, for example, a diameter of approx. 150 mm and a thickness of approx. 20 mm.

On the first shaft 10 a first disk set 24 of the multiple-disk clutch 22 is arranged slidably in the longitudinal direction but secured against rotation, which in the example is formed by five circular disk-shaped lamellar disks. A second disk set 26 of the multiple-disk clutch 22 is formed in the example by four circular disk-shaped disks and accommodated at the inner wall of a second shaft 28 which is formed as a hollow shaft secured against rotation but slidably in the longitudinal direction. The first shaft 10 protrudes into the interior of the second shaft 28 formed as a hollow shaft, and the two disk sets 24, 26 of the multiple-disk clutch 22 are in mutual engagement in the radial direction. The disk of the first disk set 24, which is the remotest from the electric machine 20, bears against a support plate 24a arranged at the shaft 10 so that the disks of the multiple-disk clutch 22 can be compressed by the electric machine 20.

A spring washer 28 which is at least partially compliant in the axial direction with its inner edge 38 bears against the face 32 of the nut 14 facing towards the multiple-disk clutch 22 in the axial direction. The spring washer 28 with its outer edge 36 can urge the first disk set 24 of the multiple-disk clutch 22 against the second disk set 26 of the multiple-disk clutch 22, if the rotor 16 of the electric machine 20 moves along the first shaft 10 towards the multiple-disk clutch 22 or away from same. Upon an axial movement of the rotor—caused by a relative rotation of the shaft 10—the two disk sets 24, 26 are thus brought into or out of friction engagement, and the first shaft 10 is securely coupled with the second shaft 28. Due to the fact that the disks are attached at the respective shaft via a female or male, respectively, toothing so that they are secured against rotation but axially slidable, the second shaft 28 which is accommodated in the housing 30 by means of the bearing 32 therefore does not carry out an axial movement relative to the first shaft 10 which is also accommodated in the housing 30 via the bearing 34. The direction of the axial movement of the rotor 16 depends on the speed and on the sense of rotation of the rotor 16 of the electric machine 20 relative to the first shaft 10 which is also rotating during operation.

In order to hold the multiple-disk clutch 22 securely in the engaged or disengaged position, the spindle 12 of the spindle/nut arrangement is provided with a detent site each in the form of a recess 42, 44 for an engaged end position and a disengaged end position. The nut 14 of the spindle/nut arrangement comprises corresponding blind holes for accommodating detent elements in the form of balls 52, 54 which are biased by means of associated spring elements 46, 48, and which are adapted to engage the respective recess 42, 44 if the rotor 16 together with the nut 14 moves into the respective end position. The thread could also be designed in the form of a bayonet catch to provide the two end positions. The electric machine 20 is connected with an electronic control unit ECU for operating the electric machine 20 either as an electric motor or as an electric generator.

The inventive configuration permits a generator operation of the electric machine 20 even with a non-engaged position of the multiple-disk clutch (i.e. with the rotor 16 not locked at the nut 14).

In addition, the electronic control unit ECU is connected with a sensor arrangement in the form of a rotary transducer 60 which supplies a signal to the electronic control unit ECU indicative for the rotation (amount and direction) of the first shaft 10. The electronic control unit ECU is adapted to operate the electric machine 20 in the electric motor mode with a speed differing from the speed of the first shaft 10, for bringing the multiple-disk clutch into the engaged or disengaged, respectively, position.

In the disengaged end position, the electric machine can also be operated as a generator for charging an accumulator 62 connected with the electronic control unit ECU. This permits to dispense with the generator in the automotive vehicle.

If the inventive arrangement is provided at several places in the automatic powershift gearbox so that the electric machines in their entirety provide a sufficient power, there is the possibility to bring the combustion engine electrically driven into rotation with the appropriate position of the individual multiple-disk clutches and the planet gearboxes. Thus this inventive arrangement also allows to dispense with the starter.

Finally it should be noted that the drawings only serve to principally illustrate the invention; the actual dimensions and proportions of functional embodiments of the invention may vary therefrom. For this with skill in the art it is also obvious and within the scope of the invention to apply the inventive solution not only with the multiple-disk clutches described but also with dry clutches.

What is claimed is:

1. An automatic powershift gearbox comprising:
   at least one gear assembly for selecting a desired gear ratio;
   at least one multiple-disk clutch capable of being actuated in a controlled manner for holding or releasing individual elements of the at least one gear assembly, which allows gear shift operations without interrupting the torque flow, with the multiple-disk clutch comprising a first and a second disk set which are in mutual engagement and can be brought into friction engagement by axial compression against one another, with the first disk set being connected with a first shaft, and the second disk set being connected with a second shaft and the multiple-disk clutch being coupled by a transmission with an electric machine comprising a rotor and a stator, for bringing the two disk sets into and out of friction engagement by means of the electric machine,
   wherein the rotor of the electric machine is supported rotatably and axially movable on one of the shafts by means of a transmission device for converting a rotary motion into a thrust motion, the transmission device comprising:
   a spindle/nut arrangement, one part of which is substantially rigidly connected with one of the shafts, and the other part of which is substantially rigidly connected with the rotor; and
   said one part of the spindle/nut arrangement has an engaged end position and a disengaged end position with one locking location each, and the other part of the spindle/nut arrangement has locking elements which are adapted to lock in the locking locations.

2. The automatic powershift gearbox according to claim 1, characterized in that:
   the rotor of the electric machine upon current supply carries out an axial movement relative to the second or the first shaft, depending on its speed and/or sense of rotation, and in a currentless condition has essentially the speed of the shaft on which it is carried.

3. The automatic powershift gearbox according to claim 1, characterized in that:
   the rotor of the electric machine is rotatably connected with the disk set arranged at the shaft carrying the rotor, so that upon an axial movement of the rotor the two disk sets are brought into or out of friction engagement.

4. The automatic powershift gearbox according to claim 3 characterized, in that:
   the rotor of the electric machine is rotatably connected with the disk set by means of a spring element which is at least partially compliant in the axial direction.

5. The automatic powershift gearbox according to claim 2, characterized in that:
   the electric machine is an asynchronous machine or a permanent field machine.

6. The automatic powershift gearbox according to claim 2, characterized in that:
   the electric machine is connected with an electronic control unit, with the electronic control unit being adapted to operate the electric machine either as an electric motor or as an electric generator.

7. The automatic powershift gearbox according to claim 1, characterized in that:
   the electronic control unit is connected with a sensor arrangement which is adapted to provide a signal indicative for the rotation of the first shaft; and
   the electronic control unit is adapted to operate the electric machine in the electric motor mode with a speed differing from the speed of the first shaft, for bringing the multiple-disk clutch into the engaged or disengaged position.

* * * * *